(12) United States Patent
Melen et al.

(10) Patent No.: US 6,404,879 B1
(45) Date of Patent: Jun. 11, 2002

(54) SYSTEM AND METHOD FOR PROVIDING DATA CONNECTIONS BETWEEN AN AGENT AND A DATABASE OF A COMPANY

(75) Inventors: Björn Melen, Espoo; Mika Hyvönen, Helsinki, both of (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/319,396
(22) PCT Filed: Dec. 19, 1997
(86) PCT No.: PCT/FI97/00821
§ 371 (c)(1),
(2), (4) Date: Aug. 2, 1999
(87) PCT Pub. No.: WO98/28923
PCT Pub. Date: Jul. 2, 1998

(30) Foreign Application Priority Data

Dec. 20, 1996 (FI) .................................................. 965162

(51) Int. Cl.[7] .......................... H04M 3/50; H04M 7/00; H04Q 3/00
(52) U.S. Cl. ............................ 379/221.09; 379/265.11; 379/266.09
(58) Field of Search .................................. 379/230, 265, 379/266, 309, 221.08, 221.09, 221.12, 265.01, 265.02, 265.11, 266.01, 266.09

(56) References Cited

U.S. PATENT DOCUMENTS

| | | | |
|---|---|---|---|
| 5,008,930 A | 4/1991 | Gawrys et al. | 379/265.11 |
| 5,036,535 A | 7/1991 | Gechter et al | 379/265.11 |
| 5,533,115 A * | 7/1996 | Hollenbach et al. | 379/265 X |
| 5,633,924 A * | 5/1997 | Kaish et al. | 379/265 X |

FOREIGN PATENT DOCUMENTS

| | | |
|---|---|---|
| EP | 0647 051 A1 | 4/1995 |
| WO | WO 96/14704 | 5/1996 |

OTHER PUBLICATIONS

J. Doyle et al., "The Intelligent Network Concept," IEEE Transactions on Communications, vol. 36, No. 12, Dec. 1988, pp. 1296–1301.

* cited by examiner

Primary Examiner—Harry S. Hong
(74) Attorney, Agent, or Firm—Jenkens & Gilchrist, P.C.

(57) ABSTRACT

The present invention provides a method and a system for providing a data connection between an agent and a database of a company to which a calling subscriber desires to make a contact and a speech and/or data connection between the agent and the calling A-subscriber as the A-subscriber calls to a service provider. According to the invention, the call is directed to a services switching point of an intelligent network, from which the information concerning the call called to the number is transferred to a services control point, a free agent is reserved in the services control point on basis of a table, an information is given to provide connections to the services switching point, a data connection is established from the database of the desired service provider to the agent, and a connection is established between the caller and the agent.

11 Claims, 5 Drawing Sheets

(continues)

Agent list for service 1

| Agent | Status |
|---|---|
| 1 | Active |
| 8 | Passive |
| 3 | Active |
| 5 | Active |

*FIG. 4a*

Agent list for service n

| Agent | Status |
|---|---|
| 2 | Passive |
| 7 | Active |
| 6 | Active |
| 3 | Passive |
| 1 | Active |

*FIG. 4b*

Status table for the Agent

| Agent | Tel. No. | Status |
|---|---|---|
| 1 | 1223445 | Free |
| 2 | 2211345 | Free |
| 3 | 2113344 | Reserved |
| 4 | 2344555 | Free |
| 5 | 3224455 | Temp. reserved |
| 6 | 1334455 | Reserved |
| 7 | 5466778 | Free |
| 8 | 3445566 | Free |
| 9 | 3422332 | Free |

*FIG. 4c*

Charging method table for a service

| Service | Payer |
|---|---|
| 1 | Client |
| 2 | Agent |
| 3 | Database |
| ... | |
| n | Agent |

*FIG. 4d*

Temporarily reserved table
Agent
5
. . .

*FIG. 4e*

SYSTEM AND METHOD FOR PROVIDING DATA CONNECTIONS BETWEEN AN AGENT AND A DATABASE OF A COMPANY

FIELD OF THE INVENTION

The present invention relates to telephone technology, and more precisely, to a method and a system for providing connections by means of intelligent network services.

BACKGROUND OF THE INVENTION

A telephone system comprises in the basic form thereof that the user selects a number, by means of which it is possible to reach another telephone user. As he/she answers to the telephone, a speech connection is established between the users. The telephone system includes also a lot of services. Eg. when calling to numbers beginning with certain numbers, eg. 0800, 0900, 800, 900, it is possible to use the services either without any charges from these to the user (toll-free) or they may be priced to have a price which is higher than the normal price for a telephone call (premium rate).

A requirement to both support and to produce various services has taken the development of communications networks towards so called intelligent network (IN). An intelligent network may be defined as an architecture which can be applied to the most of the communications networks regardless the used network technology. The object thereof is to create, control and manage teleservices providing surplus value. One special feature of the intelligent network is to be able to provide modular operations which are independent from the used service and which can be linked to each other as components when creating new services, whereby the definition and designing of new services will become easier. A further special feature is that the provision of the services is independent from the telecommunications network. The services are separated from the physical network structure which is disposed at the lowest level, and thus it is possible to distribute them.

CCITT (International Telegraph and Telephone Consultative Committee) has defined so called Intelligent Network Conceptual Model (INCM) of the intelligent network in the recommendation CS-1 (Capability Set 1). The model consists of four levels, each of which represents an abstract view of the possibilities offered by the intelligent network. The second highest level in the model is a Global Functional Plane, and it includes the view of the intelligent network as Service Independent Building Blocks SIB, from which desired features of a service and desired services are assembled by the use of a service logic. This level also comprises a Basic Call Process BCP, which covers the whole network, and a Point of Initiation POI and a Point of Return POR between the BCP and the SIBs.

Calls to the service numbers are routed to a call routing database which is called as service control point (SCP). The used numbers are usually domestic numbers. The caller may inquire account information, receive information about products and services of a certain company. When a call with a certain prefix is called, the call is directed through telephone exchanges and service switching point (SSP) to the SCP by using common channel signalling. Usually the number of the desired service is attached to the service number, whereafter it is possible to connect the call to the particular service in question. This number is called as C-number, which the subscriber usually does not know.

It is possible to adapt the intelligent network architecture to the most of the network types. It is characteristic for a multiservice network ISDN (Integrated Digital Services Network) that the user may utilize several communications services either separately or simultaneously. Different applications, which consist of a terminal device, a group of terminal devices, a multiservice switch, a local network, another private network etc., are connected to the ISDN by a limited user access group. The ISDN network enables the development of the conventional telephone to form a part of a multiservice terminal, such as a combination "a telephone + a PC", which enables simultaneous transfer of speech and data.

The ISDN interface between the user and the network comprises various types of channels which can be used between the subscriber and the network for information transfer purposes. A B-channel is a channel operating at a rate of 64 kbit/s and provided with timing and used for transferring all kinds of information, eg. by different manners coded speech or data. A D-channel, which has a transfer rate of either 16 kbit/s or 64 kbit/s, is primarily intented to form a signalling channel for the circuit switched connections. Different channel structures and ISDN user accesses are provided by combining the channels. A basic access has a 2B+D structure and a basic system access has a 30B+D structure. By using basic access one or several terminal devices are connected directly to the ISDN network whereas the basic system access is used for connecting large switches and local networks to the ISDN network.

At present, it is possible to connect local area networks to each other by the ISDN at a rate of 64 kbit/s, but this speed is, however, not enough for transferring large data records or for transferring graphical applications. The shortcomings of the ISDN networks are eliminated by networks which use asynchronous transfer mode ATM as the channeling method. Many of the large computer networks are based on the ATM technology.

In the above and in the following there are some certain definitions, which may require clarification. A network operator is an organization which operates the physical communications network. The system manufacturer is an organization which has designed and provides the communications network to the network operator. In Sweden Ericsson is this to Telia. In the Netherlands Ericsson and AT&T are this to the Dutch PTT. A user is an agent/a customer/a subscriber/a person/an organization which can use the services of the communications network. The user is often the same as the subscriber. A service provider is a person or an organization which offers the service to one or several users. At present the service provider is usually the same as the network operator, but the service providers may also be users of the services provided by the other service providers. Each user of the telecommunications network uses the network mainly for the purposes of communication with the other users. In order to enable the user to use the functions of the network, eg. to establish a call, the user has to connect himself, ie. become a subscriber, to the services available. If the user wishes to use the basic functions of the system, the user needs then to connect to the proper basic services, and if the user wishes to use the supplementary functions of the system, the user must connect him/herself to the proper supplementary services. A service is a function which is thereafter executed towards the user of a certain operation. The service request is activated eg. by lifting the telephone headset off from the hook.

Each of the basic functions and the supplementary functions is a code executed by computers in the telecommunications system. When using activation of the desired supplementary service it is accomplished by a jump instruction in the code of the executed basic function.

At present the telephone is an essential part of the operation of eg. the mail-order companies. The mail-order companies have service companies (Call Centers) which have up to several hundreds of persons receiving the calls. At present the telephone sales person (the agent) is almost without exceptions situated within the premises of the service company, especially in cases where there is a need to be in contact with the database when receiving the order. To ensure the quality of the service, various kinds of auxiliary devices have been developed, such as computer programs, by means of which it should be possible to predict the number of calls per time unit to be expected and also the expected average length of the calls. The service level is also an essential matter to eg. mail-order companies, since according to the studies the customers will try to make a call once or twice only to order the products. The likelihood that the customer will call for a third time after receiving a busy tone in the number is extremely low. In addition, the companies cannot often afford to maintain the telephone service after the normal working hours, since the arrival of calls to order something is then more uncertain and occasional.

It is possible to substantially decrease the aforementioned problems by increasing the number of the persons answering in the service company. In case the service company has a greater amount of personnel for answering and calls to be answered, the distribution of calls will then be more even and the amount of calls called to a certain service does not cause an essential decrease in the service level. The modern call center solutions are, however, intented each for one company only, and thus a telephone sales person may sell products of this particular company only. The access to the databases of a certain company is usually possible in the premises thereof only, which sets some further limitations.

A continuous problem in these solutions is the costs and the maintenance of the service level. A need of the modern age is a possibility to work also remotely from home. As there is no access from home to the databases of various companies, products of a certain company have been the only ones to be sold by a single telephone seller, or then he/she has needed to go to some office, where there are several telephone sellers in the same premises.

The slowness of the home connections and the limitations in the products available for the sales has caused that this kind of activity has not been extremely lucrative. To obtain the database connections after receiving a telephone call from the customer has taken some time, which has meant delays in the customer service and substantially long telephone connection times, which has cost a lot, and on the other hand loaded the telephone network.

In addition to the procedure in which the customer calls to order, the sales person may also call to the customer, and may thus in this case already have an immediate connection to the database. However, the customer may not have time for the discussion.

When selling products of several companies, a disadvantage of the present arrangements relates also to the possible difficulty in addressing the charging of the costs of the telephone connections to that precise companrany whose products are sold by the sales person. In addition, separate alternative customer directions, customer/subscriber identity, network, SCP and subscriber billing information is utilized in controlling and routing of the calls. This all may cause difficulties in the administration of the services.

The customer wishes to be satisfied by different criterias of the service level. One extremely important criteria is how long it will take before the telephone sales person answers the call. If the answering time is too long, the customer experiences a drop in the service level. If the customers are kept on a hold (queuing), the telephone costs may increase. The lost call may, finally, have effects to the selling result provided by the particular service, if the customer does not call again, and even complains of the bad service further.

It can also be said that due to traffic jams the outwork at home, or remote work, has become as a lucrative alternative. To enable this the method and arrangement according to the present invention solves the problem in a new and unambiguous manner.

SUMMARY OF THE INVENTION

According to the present invention, a system and a method is disclosed for utilizing telephone communications and data transfer connections by means of an intelligent network service.

The invention concerns further to provision of a handling system for call routing and a data transfer, and more precisely to provision of a handling system for call routing between the customer and the agent and a data transfer system between the agent and the service provider company by using public telephone network and an intelligent network.

The invention concerns further to provision of an almost real-time use of databases of a company, said use depending solely on the timing of the connection between the customer and the agent.

The invention concerns further to a provision of a possibility for the agent to use various applications of different service providers.

The present invention provides a method for providing a data connection between an agent and a database of a company to which a calling subscriber desires to make a contact and a speech and/or data connection between the agent and the calling subscriber as the subscriber calls to a service number of a predefined service provider. According to the invention the call is directed to a services switching point of an intelligent network, from which the information concerning the call called to the number is transferred to a services control point, a free agent is reserved in the service control point on basis of a table, an information is given to provide connections to the service switching point, a data connection is established from the database of the desired service provider to the agent, and a connection is established between the caller and the agent.

In addition, the present invention provides a system for providing a data connection between an agent and a database of a company to which a calling subscriber desires to make a contact and a speech connection between the agent and the subscriber as the subscriber calls to a service number of a predefined service provider. Said system consists of an intelligent network including a services switching point for transferring the call into the intelligent network. The intelligent network includes further a services control point for reserving a free agent on basis of a table implementd into a database of the intelligent network. To provide the necessary information for the connections to be established the following information is transferred to the services control point of the system: the database of the provider of the desired service, means enabling the communication connection of the agent, the dataconnection to be established between the agent and the database, and the speech connection to be established between the agent and the subscriber.

The additional features and advantages of the invention are evident from the description and the drawing.

BRIEF DESCRIPTION OF THE DRAWING

FIGS. 4a to 4e disclose a list of agents capable of handling the services, the availability list of the agents and a charging list.

DETAILED DESCRIPTION OF THE DRAWING

Figure 1:
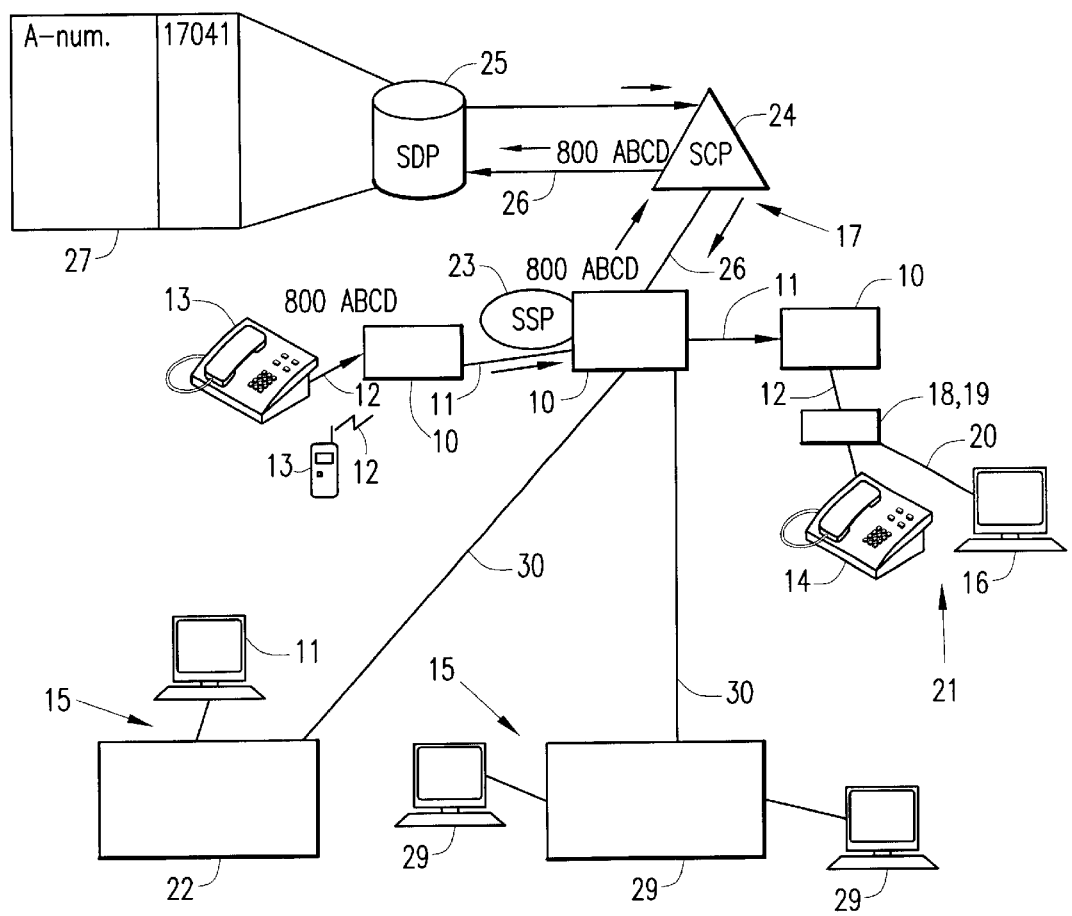
FIG. 1 is a schematic view showing intelligent network elements, a relation thereof to a public switched telephone network (PSTN), and a customer terminal, an agent terminal and a holder of a database.
Figure 2:
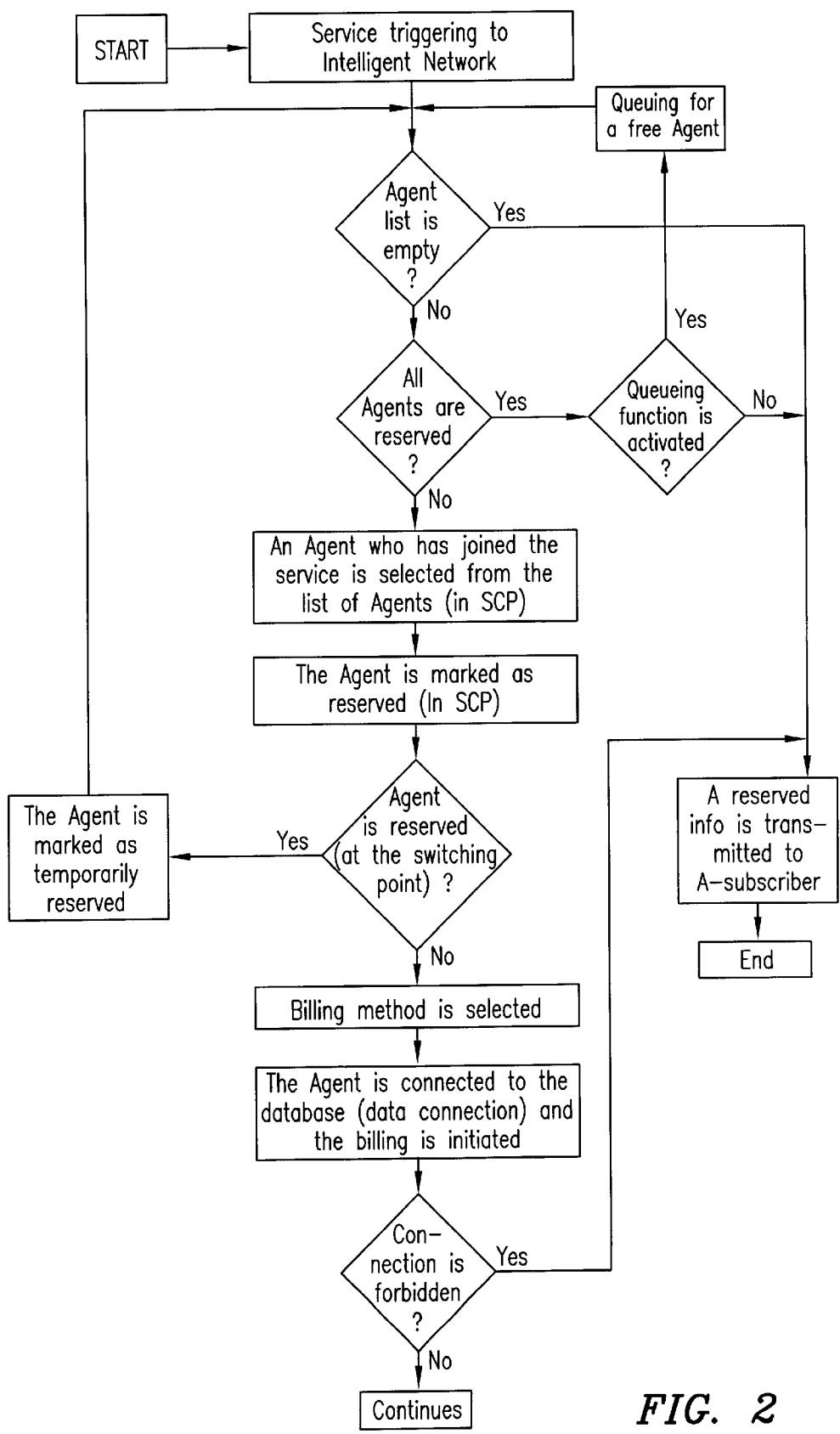
FIG. 2 is a flow chart of the stages of reservation of the agent in accordance with the present invention.
Figure 2:
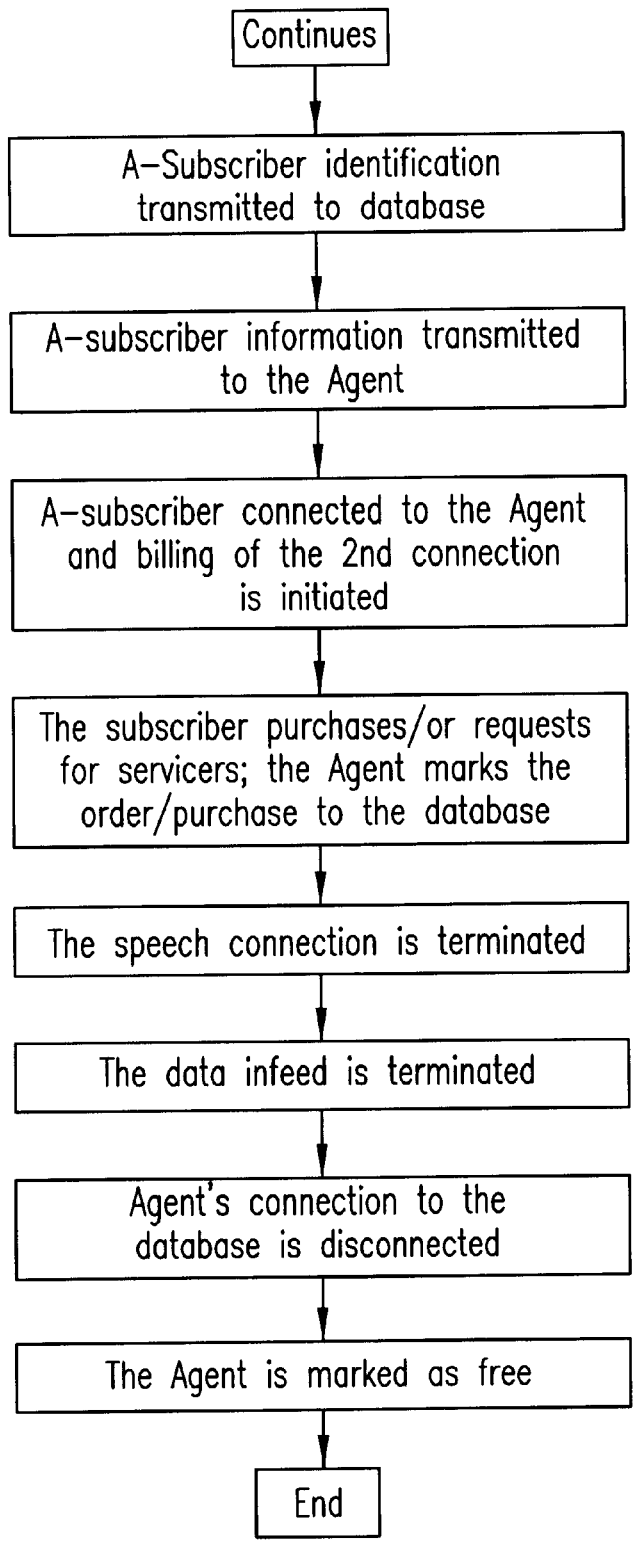
Figure 3:
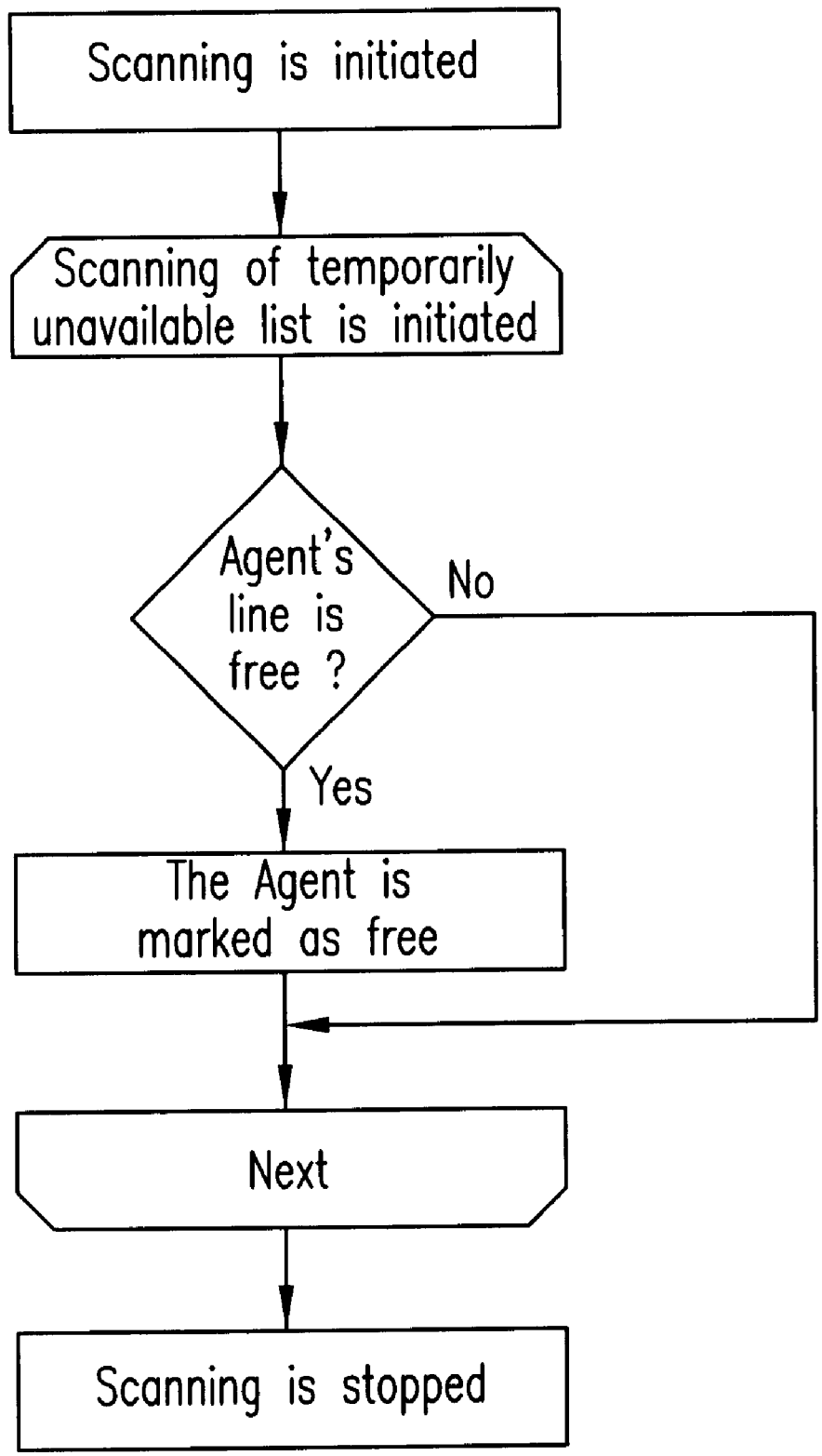
FIG. 3 discloses a flow chart for alternative stages of FIG. 1.

FIG. 1 discloses schematically one implementation of the solution in accordance with the present invention. In an intelligent network 17 the calls are routed between a plurality of alternative subscriber addresses. The information about the number of the caller, about the network, about a SCP (Service Control Point) 24, about a SDP (Service Data Point) 25 and about the subscribers is all together utilized for the purposes of routing. Usually a number of the desired service is attached to the service number, whereafter it is possible to connect the call to the desired service in question, which is at the B-number end.

The SCP 24 must be formed such that it is capable of accomplishing a determination about the address among a plurality of addresses to which a certain call has to be routed. Usually a certain service is accessed by selecting a certain number, and different numbers correspond to different services. The subscriber may, alternatively, also choose some individual additional numbers eg. in accordance with recorded instructions received from the service number.

One basic service of the intelligent network IN 17, namely a number conversion service, is now described in more detail. This is presented as an IN solution implemented prior to the present invention so as to clarify the general operation of the IN. It is to be noted that only the essential physical objects are shown in the FIG. 1.

According to this, a subscriber 13 (a fixed network or a mobile subscriber) dials eg. number 800+ABCD (ABCD being any number sequence). A service control function of an exchange 10 will identify from the 800 prefix that this is an intelligent network call and thus an intelligent network service is requested through an intelligent network switching point SSP 23. It sends, using common channel signalling 26, an inquiry to the control point SCP 24 which includes the number 800+ABCD. A corresponding service program within the SCP 24 reviews the SDP file 27 to find out which is the number in an ordinary telephone network which corresponds the number 800+ABCD. In this example the number is 17041. The SCP 24 returns this number to the SSP 23 which gives it further to the call control of the exchange 10, which will then route the call to this number. When the SCP 24 is transferring the number to the SSP 23, it will also transfer the charging information concerning the call.

A SSCP (Service Switching and Control Point), which consist of the SCP 23 and the SSP 24 in one node 10 or in the SDP 25, which is an alternative solution, includes a database 27 which contains specific subscriber related information within the individual subscriber records thereof. The record may contain the A-number 28 and information about the balance. In addition to these, the record may contain for instance black/white information, an abbreviated number of the subscriber, statistical information and instructional information. The statistical information may include the information about the amount, destination, duration etc. of the calls by the user. The instructional information instruct how to behave after certain conditions are met. This condition may be an exceeding of a preset price etc. The arrows designate the establishment of a call, as the A-subscriber 13 calls to the agent 21.

With a further reference to FIG. 1, a public switched telephone network (PSTN) is disclosed, which produces speech and/or data connections between the users. The telephone network consists of a plurality local exchanges 10 and of a plurality of transition switches. Trunk lines or wireless connections are provided between the switches and the exchanges 10. Subscriber line connections or wireless connections 12 are provided from the local exchange 10 to the subscribers.

Even though the FIG. 1 shows only two calling users 13 and only one agent 14, and only two database providers 15, it is evident that there are many more connections and that essentially greater nyumber of subscribers or users may be connected to the local exchange. In addition, there may be several local exchanges or they may be connected by several connections.

When a connection is desired, the caller 13 calls to the desired service number, whereby it is possible to route the call through several local exchanges 10 or other exchanges 10 or directly from the local exchange to the intelligent network 17. The agent 14 may also receive a data connection by his computer 16 through the public telephone network 10 (PSTN) to a local area network of some internet access provider company or to a database 15 of a company he/she desires to access, and to which he is allowed to access, either by the computer 16 provided with an ISDN adapter 18 (ISDN; Integrated Services Digital Network) from an ISDN subscriber interface of the exchange or by a connection 20 connected to a serial port (RS232 or so called COM port) of the computer through a modem 19 from an analog subscriber interface of the exchange.

When a modem connection is concerned, the agent needs a second line for the speech connection with the calling subscriber. The ISDN is already provided with two connections. The database 15 of the company is a part of the local area network of the company, containing several computers 29. For instance, an ISDN connection may be provided between the database 15 and the agent 21, whereby the connections between the company 15 and the agent 21 can be formed via telephone connections. It can also be a data connection. There are also other alternatives for accomplishing this.

The location of the agent, ie. the service seller 21 is within different premises than where the database 22 of the producer 15 of the sold product or service is, to which database the seller has an access when a client 13 calls to a predefined number. The client calls eg. to 0800 service number by the telephone, said number being usually free of charge to the client, the prefix 0800 thereof notifying the exchange that the call is to be routed to the intelligent network 17. According to the inventive solution the agent 21, who is working at home or in some other place than where the actual order/product database 15 is situated, is switched automatically to the correct database 15 as the A-subscriber 13 calls to a service trigger before or simultaneously as a speech connection becomes established between the A-subscriber 13 and the agent 21.

The agent 21 may sell many different products, since the subscriber 13 who wishes to buy a certain good or product calls to a triggering number corresponding said product, whereby the agent 21 becomes automatically connected to a correct database 15 before/simultaneously the A-subscriber 13 is connected through to the agent 21, said database being one of the plurality of databases 15 into which the agent 21 has an access. That means that the agent may have an agreement to handle customers 13 of one or several companies.

Since the different databases 15 and/or the system for receiving orders (server) have different interfaces to the communications server of the agent's computer (Client), it is practical to implement them in accordance with COBRA architecture (Common Object Request Broker Architecture) and it is practical to implement the Client software by a language which is not dependent from the operation system and hardware of the Client machine. This kind of Client software could, for example, be the Java Applet program, which is loaded from the server machine in the beginning of each session.

When the subscriber calls to the service trigger, the SSP 23 delivers the call to the SCP 24, which controls the operation of the system. In case the agent list is empty, a busy tone will be sent to all subscribers. When going through the agent list, it may happen that all agents are busy at the moment, whereafter a queuing function is activated to the A-subscriber, which will lead to a follow up of the agent status. In case it is not possible to activate the queuing function, a busy tone is given to the A-subscriber.

When a free agent is found, the SCP 24 will select this free agent 21, which becomes thus the receiver of the order. Said agent becomes also marked as unavailable (busy) in the table. If the agent is unavailable in the SSP, the agent is marked as temporarily unavailable and selection of a next free agent from the agent list is initiated.

If the agent is free in the SSP, and becomes selected, the charging may be selectively performed in the SCP 24 or in the SSP 23 such that it is possible to charge alternatively the database 15, the agent 21, the A-subscriber 13 or several of these together in accordance with a table in the SDP. Said table is implemented in accordance with the specific needs and definitions of each particular application.

When establishing the connection between the database 15 and the agent 21, the charging becomes initiated in accordance with the selected payer. When establishing the connection between the agent 21 and the calling subscriber 13, a charging from the further connection is initiated. The agent 21 becomes now reserved. In case both of the lines in the ISDN 2B of the agent 21 were not free, the SCP 24 will select a new agent 21. The terminal 16 connected to the ISDN interface 18 of the selected agent becomes connected to the sales database 15, in case the connection is allowed. In case not, a notification thereof is transmitted to the A-subscriber. The calling A-subscriber number can be transmitted from the SCP to the database 15, whereby the previous orders from that number and/or the customer relationship may be displayed to the agent 21 on the basis of the A-subscriber number. The A-subscriber 13 is connected to the agent 21, whereafter the charging from the second connection is initiated. By this manner the customer can give an order to the agent, who fills in the customer and/or order information to the database opened to the agent.

After the A-subscriber 13 and the agent 21 end their discussion another or both of them will place their telephones 13, 14 to an on-hook state, whereby the connection is released. The agent 21 closes the connection to the database 15 after he/she has finished with the updating of the database. After the speech connection and the data connection to the database 15 are released, a notification thereof will be sent to the SSP 23, whereby the agent 21 will be linked to the list of available agents, and the agent 21 is ready to receive a new commission.

After the connection has been established between the agent 21 and the customer 13, the agent 21 can sell services, eg. insurances, receive subscription orders for magazines and newspapers, and book hotels on the basis of the desires of the customer and also on the basis of the information the agent has.

The agent 21 is attached to a service list of the table discussed above. From FIGS. 4a–4e FIG. 4a discloses an agent list according to status 41. Active means that the agent is available, and passive that the agent is not available. FIG. 4b discloses in turn an agent list 40 for service n in accordance with status 43. FIG. 4c discloses an agent list in accordance with status 45. The list includes the telephone number 44 of the agent and the status 45 thereof: free, reserved or temporarily reserved. This may be formed eg. on the basis of time. The agent is working from 8.00 am. to 4.00 pm., and is thus unavailable in other times.

FIG. 4d discloses a service list table. The payer for the connection time on the basis of the service data is selected by means of the service list table 46, the payer being either the customer, the agent or the company 47 whose services are sold. It is also possible to mark the agent as temporarily reserved if he/she has a speech connection but no database connection, as is illustrated in the table 4e according to the agent list 40.

The agent has eg. a telephone and a graphical user interface as a terminal device, by means of which the system and application programs are managed by using icons, symbols, buttons, menus etc., which the user selects from the screen and usually activates by a mouse. The database of the company, from which the agent receives the information for serving the customers, consists generally of a local area network, eg. an Ethernet, in which the handling of the application has been divided between one or several servers, said servers distributing applications, data resources, connection links etc. between the computers in the communications network, and a computer of one or several agents or another user. The agents may share several different functions or databases. The network is provided either with wireless or fixed connections.

In order that the agent 21, who has linked his/hers machine 16 through a modem 19 to an ordinary telephone line 12 or to an ISDN line over an analog modem or directly through the ISDN line as 64 kbit data connection, could use graphical client programs or a WWW browser (World Wide Web browser), a SLIP protocol (Serial Line Internet Protocol) or PPP protocol (Point to Point Protocol) is used. The protocol converts the modem line 12 to an Internet cable and extends the TCP/IP connection of the Internet to pass over an ordinary telephone line 12 from the own modem 19 to the modem of the local area network. The SLIP and PPP protocols enable the Internet communications by means of the serial port of the computer, whereby the computer 16 behind the serial connection operates as one workstation or PC 16 connected to the local area network.

The agent may receive the connection as a service provider to the local area network eg. by starting a known client program (a short program which is in use in the Internet applications and which is programmed eg. by the Java, which is an object oriented, hardware independent C++ language type programming language compatible with various protocols). In this case the agent is connected to the Internet via a service provider providing connections to the Internet. The Client is a computer system or process which asks for a service of another computer system or process. When the user or agent 21 has activated the Client including the information of the desired service provider, a window is opened on the screen of the user.

When the agent uses the internet connections, the connections from the exchange 10 to the local area network of the service provider are data connections, such as Ethernet connections, as is also the case with connections from the local area network to the internet, routers and servers etc. The routers are implemented between the data networks, said routers directing the connections between the addresses by means of router tables.

The above description and the related drawings are intented only to illustrate the present invention. The different variations and modifications are obvious to the skilled person without departing from the scope and spirit of the invention as defined in the appended claims.

What is claimed is:

1. A method for providing a data connection between an agent and a database of a company to which a calling subscriber desires to make a contact and a speech and/or a data connection between the agent and the calling subscriber as the subscriber calls to a service number of a predefined service provider, comprising:

directing a call to a services switching point of an intelligent network;

transferring information about the call called to the service number to a services control point of the intelligent network;

reserving an agent that is available in the services control point on the basis of a table in the intelligent network;

providing information to the services control point to establish the connections;

establishing a data connection from the database of the service provider to the agent; and establishing a second connection between the calling subscriber and the agent.

2. The method according to claim 1, wherein the agent is selected on the basis of a selection criteria arranged in the table, and the agent is marked as unavailable in said table after said selection.

3. The method according to claim 1, wherein a charging function is initiated in accordance with a preselected payer, said preselected payer being indicated by a table implemented in the intelligent network as the connection is established between the database and the agent.

4. The method according to claim 1, wherein the subscriber data of the calling subscriber is transmitted to the database and/or the agent.

5. The method according to claim 1, wherein a charging from the second connection is initiated as the connection is established between the agent and the calling subscriber.

6. The method according to claim 1, further comprising:

releasing the connection between the calling subscriber and the agent, the supply of data to the database is being stopped thereafter;

releasing the connection between the agent and the database, and marking the agent as available in the table.

7. The method according to claim 1, further comprising:

providing a queuing tone to the calling subscriber;

marking the agent as temporarily unavailable when the call arrives to the intelligent network and the agent is simultaneously unavailable; and searching for another agent that is available among the temporarily-unavailable agents and an agent list of the table.

8. The method according to claim 7, wherein the agent is simultaneously unavailable because the agent is handling a call, is about to receive a call, or has a data connection is use.

9. The method according to claim 1, wherein a data connection is extended from the agent's machine to a local area network of a service company providing connections, said local area network being connected to a data network from which there is an access to the database of the company providing the services/goods.

10. A system for providing a data connection between an agent and a database of a company to which a calling subscriber desires to make a contact and a speech and/or a data connection between the agent and the calling subscriber as the calling subscriber calls to a service number of a predefined service provider, said system comprising:

an intelligent network including:

a services switching point for transferring the call into the intelligent network; and a services control point for reserving an agent that is available on basis of a table in the database of the intelligent network, information concerning the connections to be connected is transferred to the services control point so as to provide the connections, said information containing information about the database of the provider of the desired service, about enabling the connections of the agent, about the data connection to be established between the agent and the database, and about the speech connection to be established between the agent and the calling subscriber.

11. The system according to claim 10, further comprising means for selecting a payer for the costs of the connections, the selected payer being one or several among the following: the subscriber, the agent, the service provider or the company providing the services/goods.

* * * * *

UNITED STATES PATENT AND TRADEMARK OFFICE
CERTIFICATE OF CORRECTION

PATENT NO. : 6,404,879 B1
DATED : June 11, 2002
INVENTOR(S) : Bjorn Melen et al.

It is certified that error appears in the above-identified patent and that said Letters Patent is hereby corrected as shown below:

Column 10,
Line 8, replace "database, and marking" with -- database; and marking --
Line 20, replace "data connection is use" with -- data connection in use --

Signed and Sealed this

Fourth Day of March, 2003

Attest:

JAMES E. ROGAN
Attesting Officer     Director of the United States Patent and Trademark Office